(12) United States Patent
Farlee et al.

(10) Patent No.: US 7,657,579 B2
(45) Date of Patent: Feb. 2, 2010

(54) TRAVERSING DATA IN A REPEATABLE MANNER

(75) Inventors: Kevin Farlee, Maple Valley, WA (US); Richard Reitmeyer, Menlo Park, CA (US); William Maruyama, Los Altos, CA (US)

(73) Assignee: EMC Corporation, Hopkinton, MA (US)

( * ) Notice: Subject to any disclaimer, the term of this patent is extended or adjusted under 35 U.S.C. 154(b) by 373 days.

(21) Appl. No.: 11/107,995

(22) Filed: Apr. 14, 2005

(65) Prior Publication Data

US 2006/0235847 A1   Oct. 19, 2006

(51) Int. Cl.
G06F 17/30 (2006.01)
G06F 12/00 (2006.01)
G06F 13/00 (2006.01)

(52) U.S. Cl. .......................... 707/204; 707/7; 711/161; 711/162

(58) Field of Classification Search .................... 707/7, 707/204; 711/161, 162
See application file for complete search history.

(56) References Cited

U.S. PATENT DOCUMENTS

| | | | | |
|---|---|---|---|---|
| 4,453,217 A * | 6/1984 | Boivie | | 707/5 |
| 5,241,668 A * | 8/1993 | Eastridge et al. | | 714/5 |
| 5,276,874 A * | 1/1994 | Thomson | | 707/102 |
| 5,644,736 A * | 7/1997 | Healy et al. | | 715/784 |
| 5,764,877 A * | 6/1998 | Lomet et al. | | 714/6 |
| 5,838,783 A * | 11/1998 | Cheng et al. | | 379/355.05 |
| 5,918,229 A * | 6/1999 | Davis et al. | | 707/10 |
| 6,148,377 A * | 11/2000 | Carter et al. | | 711/147 |
| 6,199,074 B1 * | 3/2001 | Kern et al. | | 707/204 |
| 6,330,570 B1 | 12/2001 | Crighton | | |
| 6,625,591 B1 * | 9/2003 | Vahalia et al. | | 707/1 |
| 6,647,393 B1 * | 11/2003 | Dietterich et al. | | 707/102 |
| 6,687,849 B1 * | 2/2004 | Cherf | | 714/5 |
| 6,779,003 B1 | 8/2004 | Midgley et al. | | |
| 6,804,690 B1 * | 10/2004 | Dysert et al. | | 707/204 |
| 7,007,047 B2 * | 2/2006 | Zelenka et al. | | 707/204 |
| 7,069,402 B2 * | 6/2006 | Coulter et al. | | 711/162 |
| 7,085,962 B1 * | 8/2006 | Hamilton et al. | | 714/15 |
| 7,234,077 B2 * | 6/2007 | Curran et al. | | 714/15 |
| 7,546,305 B2 * | 6/2009 | Sathyanarayan | | 707/101 |
| 2001/0054042 A1 * | 12/2001 | Watkins et al. | | 707/100 |
| 2002/0012296 A1 | 1/2002 | Suzuki | | |
| 2002/0075331 A1 * | 6/2002 | Orbanes et al. | | 345/854 |
| 2002/0103982 A1 | 8/2002 | Ballard et al. | | |
| 2002/0107877 A1 * | 8/2002 | Whiting et al. | | 707/204 |
| 2002/0152194 A1 * | 10/2002 | Sathyanarayan | | 707/1 |
| 2003/0018878 A1 * | 1/2003 | Dorward et al. | | 711/216 |
| 2003/0056139 A1 * | 3/2003 | Murray et al. | | 714/4 |
| 2003/0093420 A1 * | 5/2003 | Ramme | | 707/3 |
| 2003/0135704 A1 * | 7/2003 | Martin | | 711/162 |
| 2003/0172094 A1 * | 9/2003 | Lauria et al. | | 707/206 |

(Continued)

OTHER PUBLICATIONS

Vipin Kumar, V. Nageshware Rao, "Parallel depth first search. Part II. Analysis", Springer Netherlands, International Journal of Parallel Programming, vol. 16, No. 6 / Dec. 1987, 501-519.*

(Continued)

*Primary Examiner*—Robert Stevens
(74) *Attorney, Agent, or Firm*—Van Pelt, Yi & James LLP

(57) ABSTRACT

Traversing hierarchical data is disclosed. A first list of items in a first level of the data is received and sorted in an order. The data of the first level is processed in the order of the sorted first list. If any other level of data is encountered during processing, another list of items in the encountered level is received and sorted in an order. The data is processed in the order of the list.

31 Claims, 8 Drawing Sheets

U.S. PATENT DOCUMENTS

| | | | |
|---|---|---|---|
| 2003/0187883 A1* | 10/2003 | Zelenka et al. | 707/201 |
| 2003/0236933 A1* | 12/2003 | Shigeta et al. | 710/72 |
| 2004/0117410 A1* | 6/2004 | Dietterich et al. | 707/200 |
| 2004/0199485 A1* | 10/2004 | Caswell | 707/1 |
| 2004/0267822 A1* | 12/2004 | Curran et al. | 707/200 |
| 2004/0267838 A1* | 12/2004 | Curran et al. | 707/204 |
| 2005/0027757 A1* | 2/2005 | Kiessig et al. | 707/204 |
| 2005/0033911 A1 | 2/2005 | Kitamura et al. | |
| 2008/0126445 A1 | 5/2008 | Michelman | |

OTHER PUBLICATIONS

Quinlan, Sean, et al., "Venti: A New Approach to Archival Storage", Proc. Of the FAST 2002 Conf. on File and Storage Technologies, Monterey, CA, Jan. 28-30, 2002, pp. 1-14.*

Kleindienst, Jan, et al., "Lessons Learned from Implementing the CORBA Persistent Object Service", OOPLSLA '96, San Jose, CA, © 1996, pp. 150-167.*

Vogels, Werner, "File System Usage in Windows NT 4.0", SOSP-17, Kiawah Island, SC, Dec. 1999, pp. 93-109.*

Cole, Andrew W., "Proposed Component Tools for Corpus Map Utility to Characterize Large File Systems", Masters Thesis, Univ. of Pennsylvania, © 2002, pp. i-v and 1-32.*

* cited by examiner

TRAVERSING DATA IN A REPEATABLE MANNER

BACKGROUND OF THE INVENTION

With the exponential growth trend of storage unit capacities, file system sizes are growing exponentially larger as well. Since a file system backup utility must traverse the entire file system in order to locate and back up all required files and directories, large file systems can take a significant amount of time to backup. Longer backup times can also mean a greater risk of interruptions during the backup process. For example, a brief network failure in a networked backup system or any other failure in a client or a server can cause the backup process to be interrupted. In the event of a backup failure, a typical backup system restarts the backup process from the beginning of a set of data being backed up in a backup operation (e.g., a grouping of files and/or directories to be backed up), sometimes referred to herein as a "saveset". Given the long backup durations and the possibility of further interruptions, starting a backup process over after every interruption can significantly affect the performance of a backup system.

In a typical backup system or process, a backup operation cannot pick up where it left off even if the data comprising the saveset had not been modified since the interruption because in at least some cases the traversal of a file system is not guaranteed to occur in the same order each time. For example, a "readdir" (read directory) command to read entries from a given directory can return results in a different order for separate instances of the same command. Therefore, there exists a need to guarantee data traversal will be performed in a repeatable manner.

BRIEF SUMMARY OF THE INVENTION

Locating data last saved during backup is disclosed. A segment ending offset relative to a reference point of a last segment of data associated with a hierarchical data set is determined. The last segment is the last data associated with the hierarchical data set to be saved on a storage media. A location within the hierarchical data set of a data object that was the last data object saved completely to the storage media by comparing a data object ending offset relative to the reference point with the segment ending offset is determined.

BRIEF DESCRIPTION OF THE DRAWINGS

Various embodiments of the invention are disclosed in the following detailed description and the accompanying drawings.

DETAILED DESCRIPTION

Figure 1:
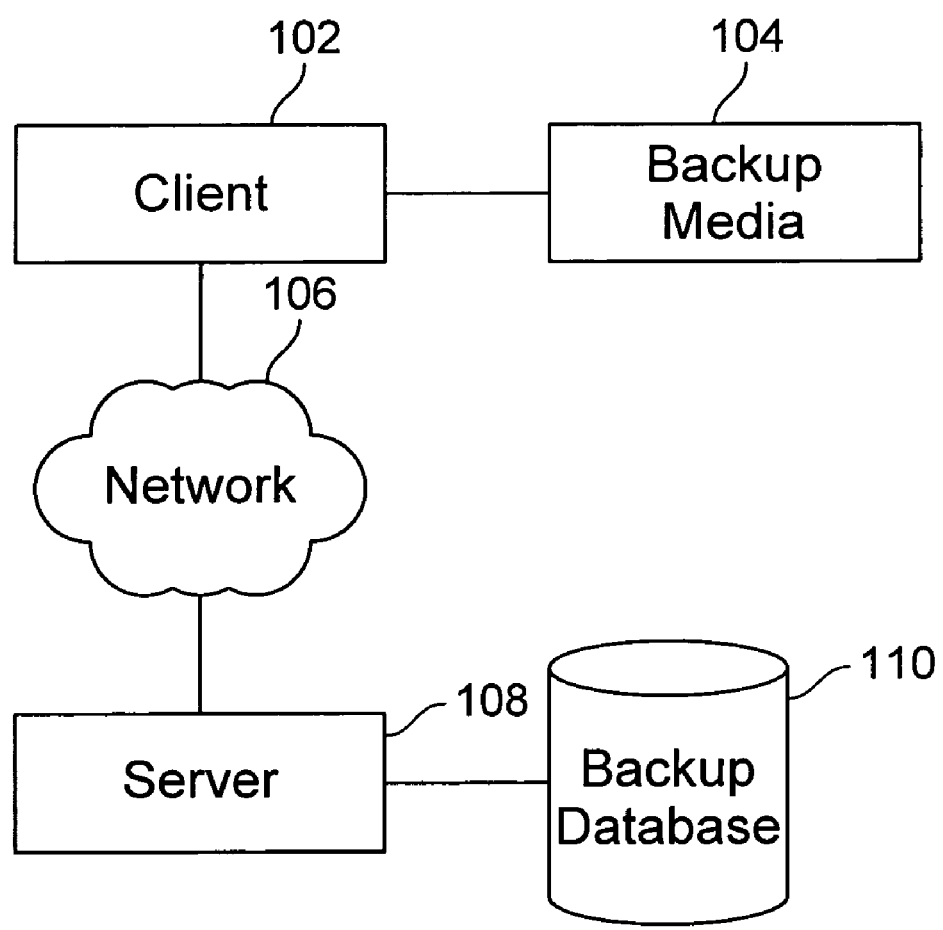
FIG. 1 illustrates an embodiment of a backup system environment.

The invention can be implemented in numerous ways, including as a process, an apparatus, a system, a computer program product embodied in computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Traversing hierarchical data in a repeatable manner is disclosed. In an embodiment, a list of items comprising at least a portion of data at a first level of the hierarchical data is read and sorted into a prescribed order for traversal repeatability. For example, when traversing a file system in a repeatable manner to perform a backup operation with respect to the file system or a portion thereof, the contents of each directory is read into a list and sorted (e.g., into alphabetical order by file name). File system entries are backed up (or other data processed) in the order of the sorted list. If a second level of data is encountered, data in the second level is read and sorted into the prescribed order, and then processed in the order into which the data has been sorted. If traversal of the data is interrupted, in a resume operation are read and then sorted into and processed in the same prescribed ordered as in the interrupted operation, ensuring that no data elements will be missed, even if elements at each level are read or otherwise received in a different order, if processing resumes at a point at which the interrupted operation was interrupted.

In an embodiment, when a file system entry is successfully saved to a back up media as part of a backup operation, a record of the backup is made. This record can be used later to resume backup at the last successfully recorded backup point if a failure occurs during backup. In an embodiment once the last backed up point is found in a backup resume operation, the backup system or process re-establishes backup operation context without exhaustively traversing the file system. An interrupted backup operation is resumed by reestablishing context and resuming processing starting with a data element that follows the last file successfully and completely backed up prior to the interruption. Traversing the file system in the same, repeatable order ensures that no files will be missed or stored in duplicate on the backup media.

FIG. 1 illustrates an embodiment of a backup system environment. In the example shown, client 102 is connected to server 108 through network 106. There can be any number of clients and servers connected to the network. The network may be any public or private network and/or combination thereof, including without limitation an intranet, LAN, WAN, and other forms of connecting multiple systems and or groups of systems together. Client 102 is connected to backup media 104. In some embodiments, the backup media can be one or more of the following storage media: hard drive, tape drive, optical storage unit, and any non-volatile memory device. More than one backup media can exist. In an embodiment, backup media 104 is connected directly to the network. In another embodiment, backup media 104 is connected to server 108. In another embodiment, backup media 104 is connected to client 102 through a SAN (Storage Area Network). Backup database 110 is connected to server 108. In an embodiment, backup database 110 contains data associated with data on one or more clients and/or servers. In another embodiment, backup database 110 contains data associated with data written to one or more backup media. In another embodiment, backup database 110 is directly connected to the network. In another embodiment, backup database 110 is connected to client 102. In another embodiment, backup database 110 is a part of server 108 and/or client 102. In an embodiment, backup of client 102 is coordinated by server 108. Server 108 instructs the client to backup data to backup media 104. When the data is successfully written to the backup media, a record is made on backup database 110. In another embodiment, server 108 cooperates with a backup agent running on client 102 to coordinate the backup. The backup agent may be configured by server 108.

Figure 2:
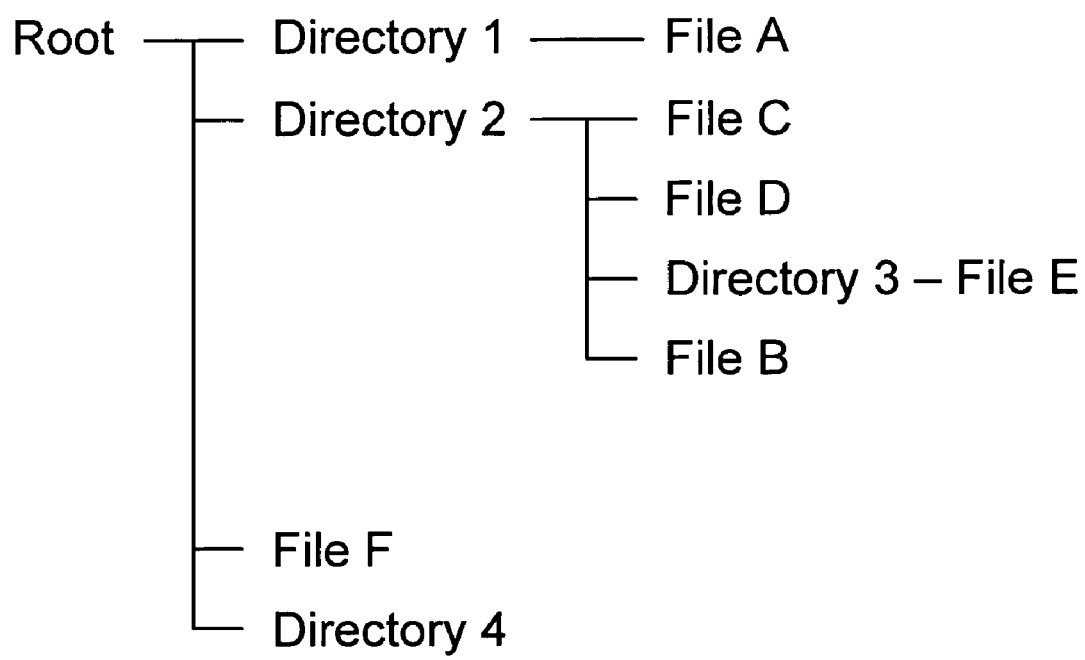
FIG. 2 illustrates an embodiment of a file system tree structure.

FIG. 2 illustrates an embodiment of a file system tree structure. In an embodiment, a portion of the data in a system to be backed up (saveset) could be the entire file system or a portion of the file system. In an embodiment, the file system is traversed in a repeatable manner to ensure any subsequent traversal starting at any same point in the file system is performed in the same order. In the example shown, traversal is ordered alphabetically by file name first then by directory name. In other embodiments, any canonical ordering of file system entries can be used. Traversal begins at the root directory. Entries of the root directory are read and sorted. The sorted list in order comprises: File F, Directory 1, Directory 2, Directory 4. Data corresponding to the entries of the list are backed up in the order of the list. When Directory 1 is encountered to be backed up, the backup process descends into Directory 1, a list is created comprising: File A, and File A is backed up. After Directory 1 has been traversed, traversal resumes on the entries of the root directory list. When Directory 2 is encountered, an ordered list of its contents is created, comprising in order: File B, File C, File D, Directory 3. Data corresponding to the entries of the list are backed up in the order of the list. When Directory 3 is encountered, a list and backup corresponding to File E are created. Since Directory 4 is empty, an entry corresponding to Directory 4 is backed up without any associated files.

Figure 3A:
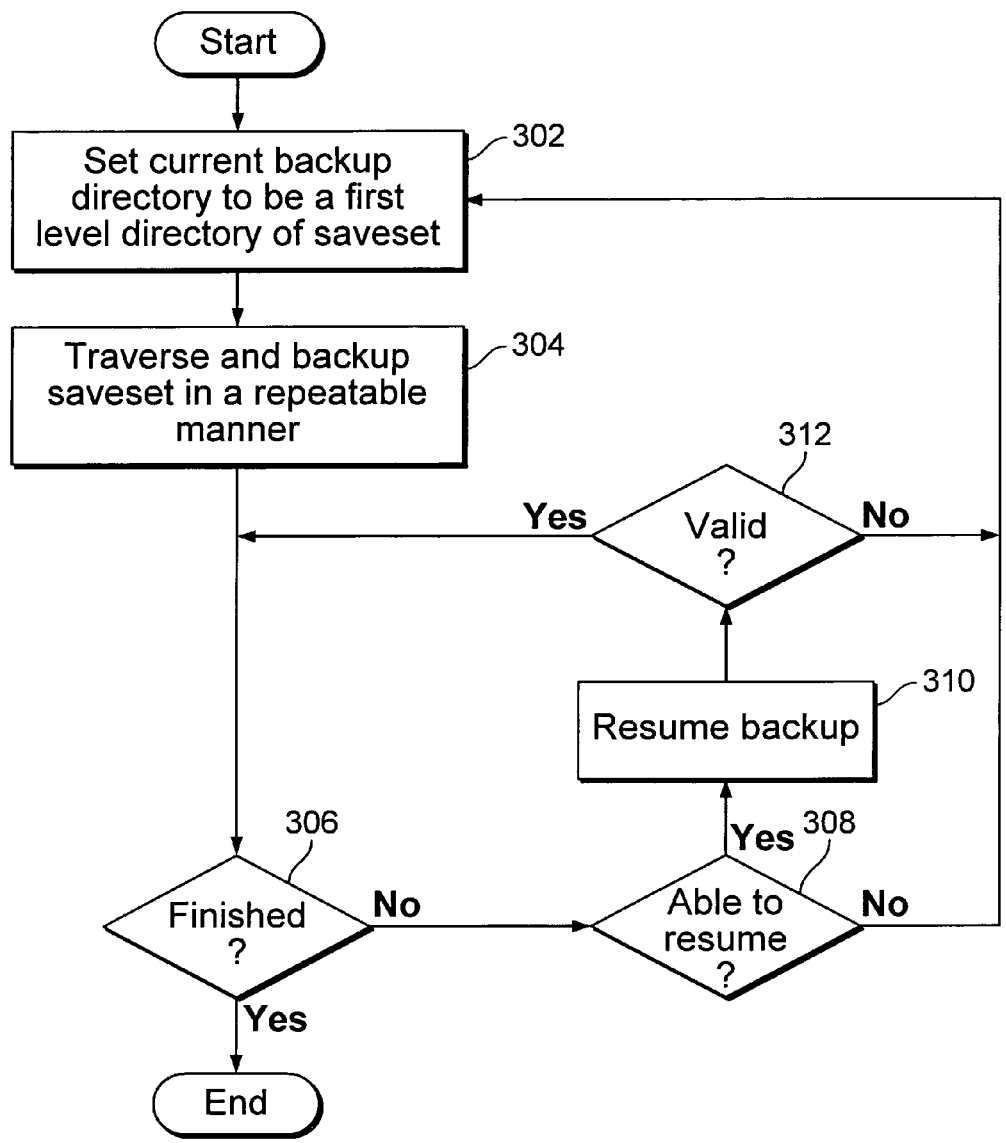
FIG. 3A illustrates an embodiment of a process for backing up a saveset.

FIG. 3A illustrates an embodiment of a process for backing up a saveset. In the example shown, a current backup directory is set to be a first level directory of the saveset at 302. In an embodiment, the current directory is set in 302 be associated with a root directory of a file system. The saveset may be preconfigured, dynamically configured, specified through a user interface, set to any first level of data, and/or determined in some other way. The saveset can be any data structured in a hierarchy such as data organized as a tree, a directory, an array, and/or a linked list. The current backup directory is a directory associated with data the process is currently backing up. The current backup directory can be preconfigured, dynamically configured, and/or specified through a user interface to be any data point in the processing data. In an embodiment, a first level directory is any classification level of data referring to the most general, i.e. first encountered, level of data. At 304, the saveset data is traversed and backed up in a repeatable manner. In other embodiments, any hierarchical data can be traversed in a repeatable manner using the process associated with 304. In an embodiment, the process associated with 304 can be discontinued, e.g., due to an interruption. If it is determined at 306 that traversing and backing up the saveset has not finished due to a discontinuation of the process, the process continues to 308 in which it is determined whether it is possible to resume the interrupted backup operation. If the backup process is able to resume backup from the last successful backup point as determined at 308, the backup process is resumed at 310. In an embodiment, a backup process can resume from the last successful backup point if a prescribed amount of time has not passed since the last backup point time and/or the backup starting time. In an embodiment, the amount of time can be preconfigured and/or dynamically configured. In an embodiment, a backup process can resume from the last successful backup point if the complete or a portion of the saveset has not been modified since the discontinuation. If it is determined at 312 during the resumed backup that the resumed backup process is invalid or if it is determined at 308 that the backup process is not able to resume, the backup operation restarts (302). In an embodiment, the resumed backup process is determined at 312 to be invalid if the last file saved successfully to the backup media prior to the interruption has been removed from the saveset or modified since the interruption. If it is determined at 312 that the resume backup process is valid, the resumed backup process continues until it is determined at 306 that the backup operation has been completed, in which case the process of FIG. 3A ends, or it is determined at 306 that the resumed backup process has been interrupted, in which case 308-312 are repeated. In an embodiment if the resumed backup process is discontinued before a valid determination is made at 312, the backup operation restarts from the beginning (302).

Figure 3B:
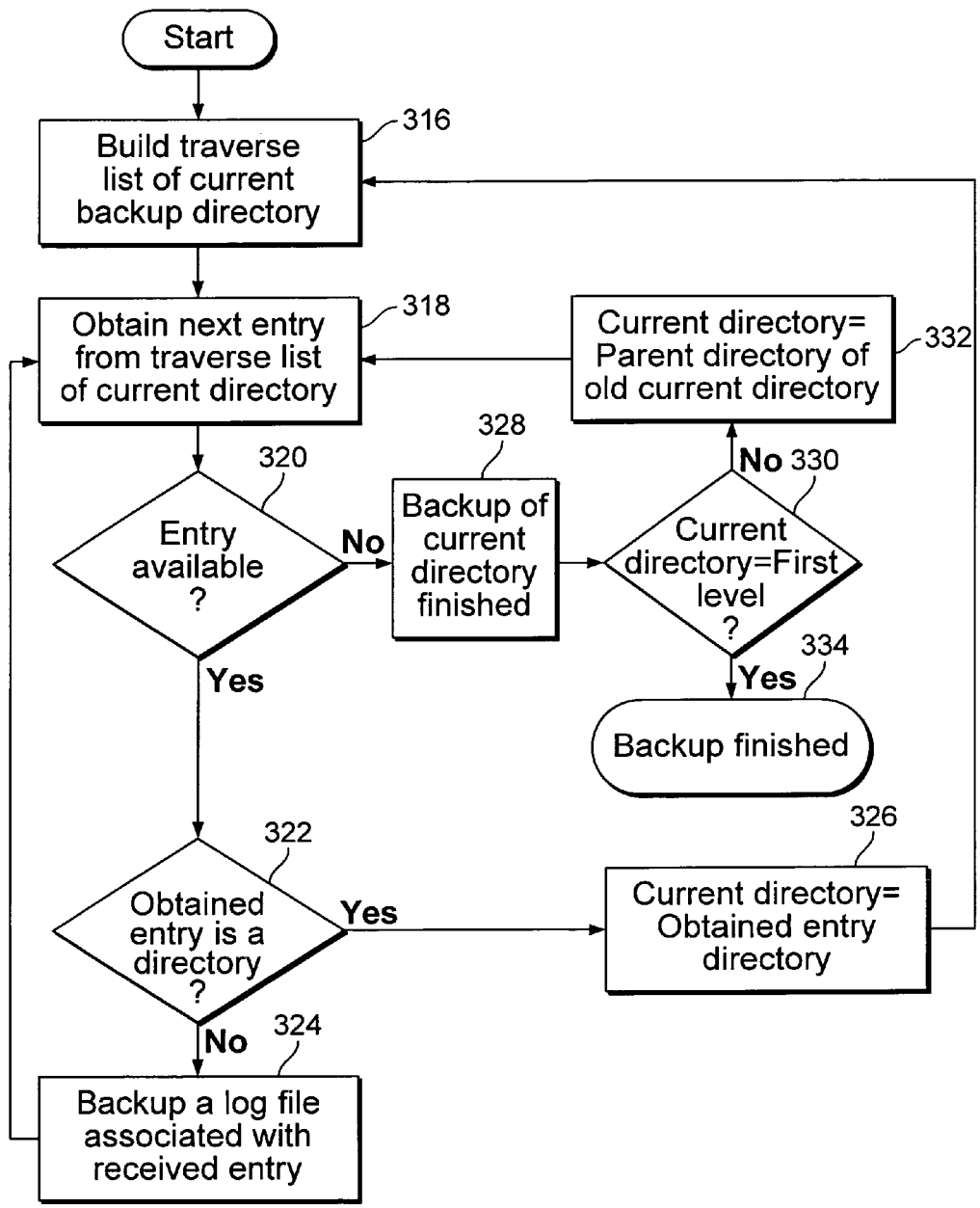
FIG. 3B illustrates an embodiment of a process for traversing and backing up data in a repeatable manner.

FIG. 3B illustrates an embodiment of a process for traversing and backing up data in a repeatable manner. The process of FIG. 3B is used in one embodiment to implement 304 of FIG. 3A. In the example shown, a traverse list of the current backup directory is built at 316. The traverse list comprises a list of entries in the current directory sorted in a repeatable order. In an embodiment, the traverse list is saved. In an embodiment, the traverse list is built concurrently as the traversal and backup process continues. At 318, a next entry from the traverse list is obtained. In an embodiment, entries from the traverse list are obtained in the order of the list. In another embodiment, entries from the traverse list are obtained in a repeatable order, not in the order of the list. If at 320 it is determined an entry was successfully obtained (an entry to be processed existed in the traverse list) and the obtained entry does not correspond to a directory as determined at 322, the file system entry associated with the obtained entry is backed up and logged at 324, and a next entry from the traverse list is obtained at 318. In an embodiment, the file system entry is saved at 324 to a backup media. In an embodiment, the backup is logged in order to be able to identify, e.g., in the event the backup operation is interrupted, the last file in the saveset that was saved successfully to the backup media. In an embodiment, the log of the backup is saved to a backup database. In an embodiment, the file name, file size, and an offset from the beginning of the saveset that identifies the location of the file within the saveset, as traversed as described herein. If it is determined at 322 that the obtained entry corresponds to a directory, the current backup directory is set as the directory corresponding to the obtained entry, and at 316 a traverse list is built for the new current directory. If no more entries to be processed had existed in the traverse list as determined at 320, the backup of the current backup directory is determined to be finished at 328. In an embodiment, data associated with the current directory is backed up and/or logged when all elements associated with the current directory have been backed up. If the current directory is not the first level directory as determined at 330, the current directory is set as the parent directory of the currently finished directory at 322, and the next entry from the traverse list of the newly set current directory is obtained at 318. In an embodiment, the first level directory is the root directory of the saveset. In an embodiment, the parent directory is the directory corresponding to a previous current backup directory that had been replaced by the directory that has just finished processing. In an embodiment, current backup directories are placed inside a stack data structure, i.e. as the current backup directory changes, directories are either added or taken off the stack. In another embodiment, the corresponding traverse lists to the current backup directories are also placed inside a stack. If the current directory is the first level directory as determined at 330, the backup is indicated at 334 to be finished. In an embodiment, 334 corresponds to a "finished" decision at 306 of FIG. 3A. In an embodiment if the process of 3A is discontinued before the process reaches 334, the traversal and backup process is not finished. In an embodiment if an error occurs during the backup process, the traversal and backup process is not finished. In an embodiment, an error includes one or more of the following: invalid traverse list entry, invalid current directory, invalid data structure, memory error, processing error, and/or any other error associated with the process. In an embodiment if the traversal and backup process is discontinued or interrupted prior to a "finished" determination being made at 334, a "not finished" determination is made at 306 of FIG. 3A.

Figure 3C:
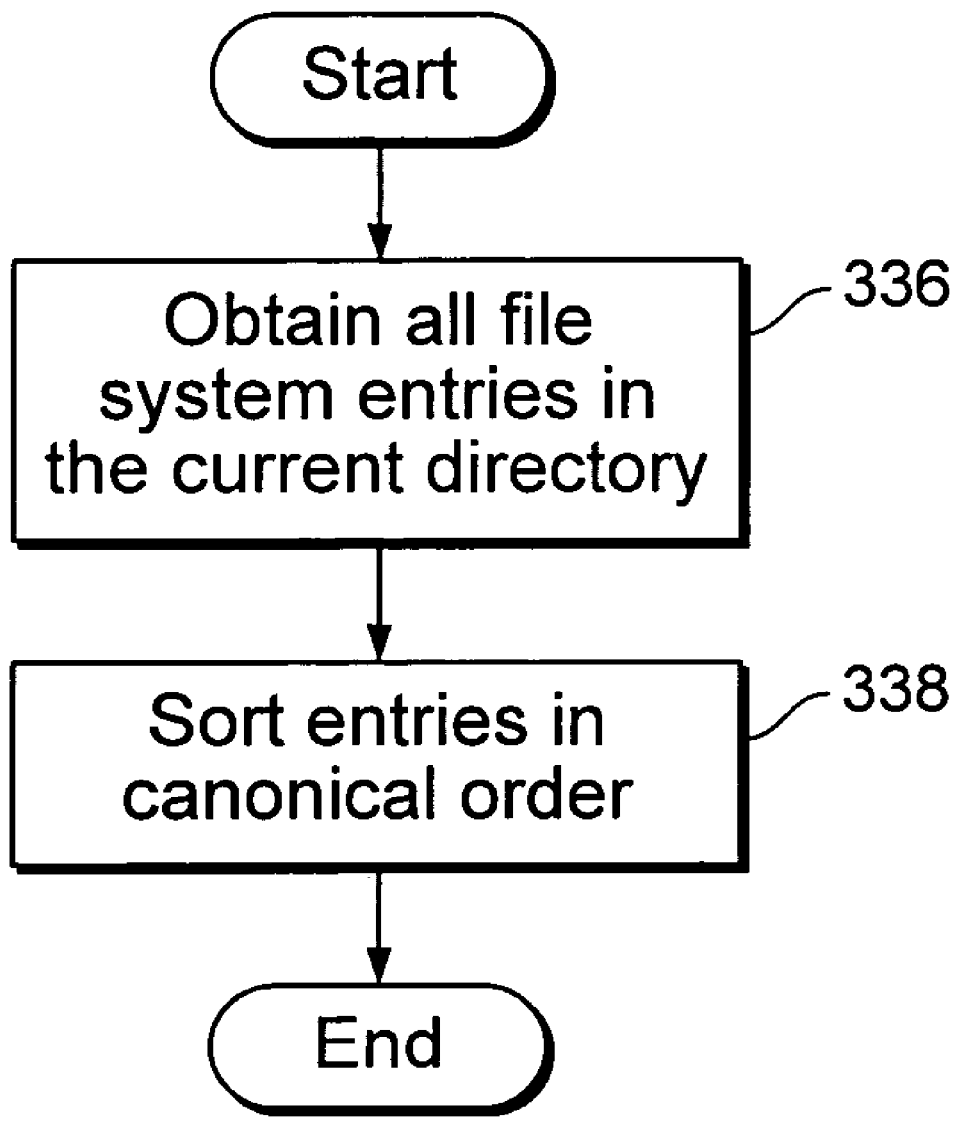
FIG. 3C illustrates an embodiment of a process for building a traverse list.

FIG. 3C illustrates an embodiment of a process for building a traverse list. The process of FIG. 3C is used in one embodiment to implement 316 of FIG. 3B. In the example shown, all file system entries in the current directory are obtained at 336. In an embodiment, obtaining includes processing one or more "readdir" or similar commands. In another embodiment, any process of obtaining file system entries can be used. In an embodiment, the file system entries are stored in memory. At 338, the entries are sorted in canonical order. The canonical ordering can be based on file name, modification time, inode number, creation time, file size, and/or any other file attribute that can be used to order file system entries. In an embodiment, any repeatable ordering may be used to sort the list. In another embodiment, file system entries are obtained in a repeatable order, and no sorting is required. In another embodiment, the entries are not sorted. In an embodiment, the entries are placed in a list. In another embodiment, the entry list is saved.

Figure 3D:
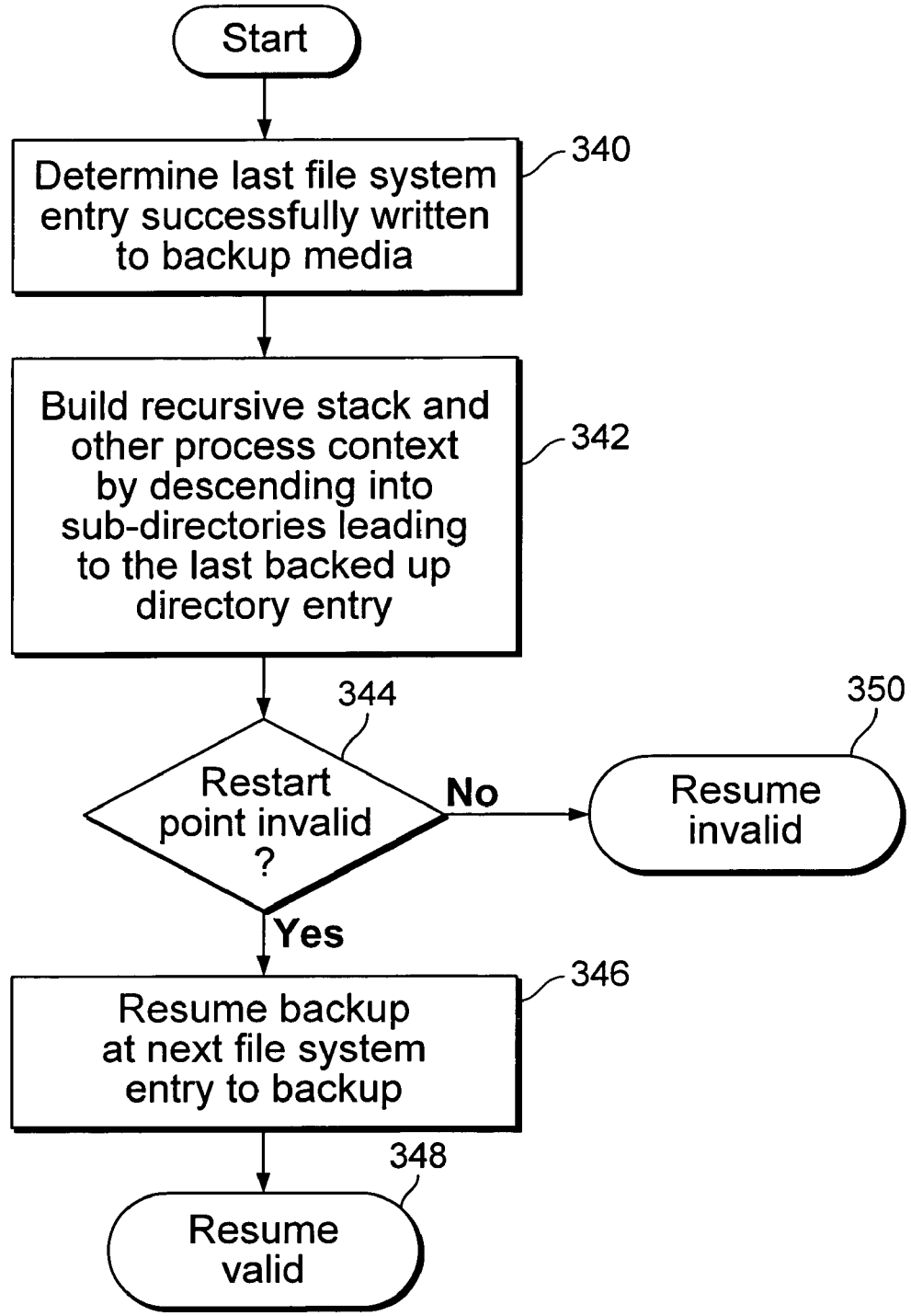
FIG. 3D illustrates an embodiment of a process for resuming an interrupted backup operation.

FIG. 3D illustrates an embodiment of a process for resuming an interrupted backup operation. The process of FIG. 3D is used in one embodiment to implement 310 of FIG. 3D. In the example shown, a last file successfully written to a backup media is determined at 340. At 342, a recursive stack (stack entries resulting from a recursive process) and other process context are built by descending through recursive function calls only into sub-directories leading to the last backed up directory entry. In an embodiment, other process context includes one or more traverse lists. In other embodiments, other process context includes process variables and/or data structures. A non-recursive process may be used to traverse the backup data. In an embodiment, the recursive stack is not built. The backup data may not comprise sub-directories. If during the process context building, a restart point, i.e., a component associated with the last backed up entry or the last backed up entry, is determined at 344 to be invalid, it is concluded at 350 that the resumed backup operation is invalid. In an embodiment, the conclusion of 350 is associated with the invalid decision at 312 of FIG. 3A. In an embodiment, a component of the last backed up entry or the last backed up entry may not be found due a modification of the file system. If the last backup point entry and all of its components exist as determined at 344, the backup is resumed at the next file system entry to backup at 346 and it is concluded at 348 that the resumed backup operation is valid. In an embodiment, the conclusion of 348 is associated with the valid decision at 312 of FIG. 3A. In another embodiment if an error occurs during the resume process, the resume operation invalid conclusion is reached.

Figure 3E:
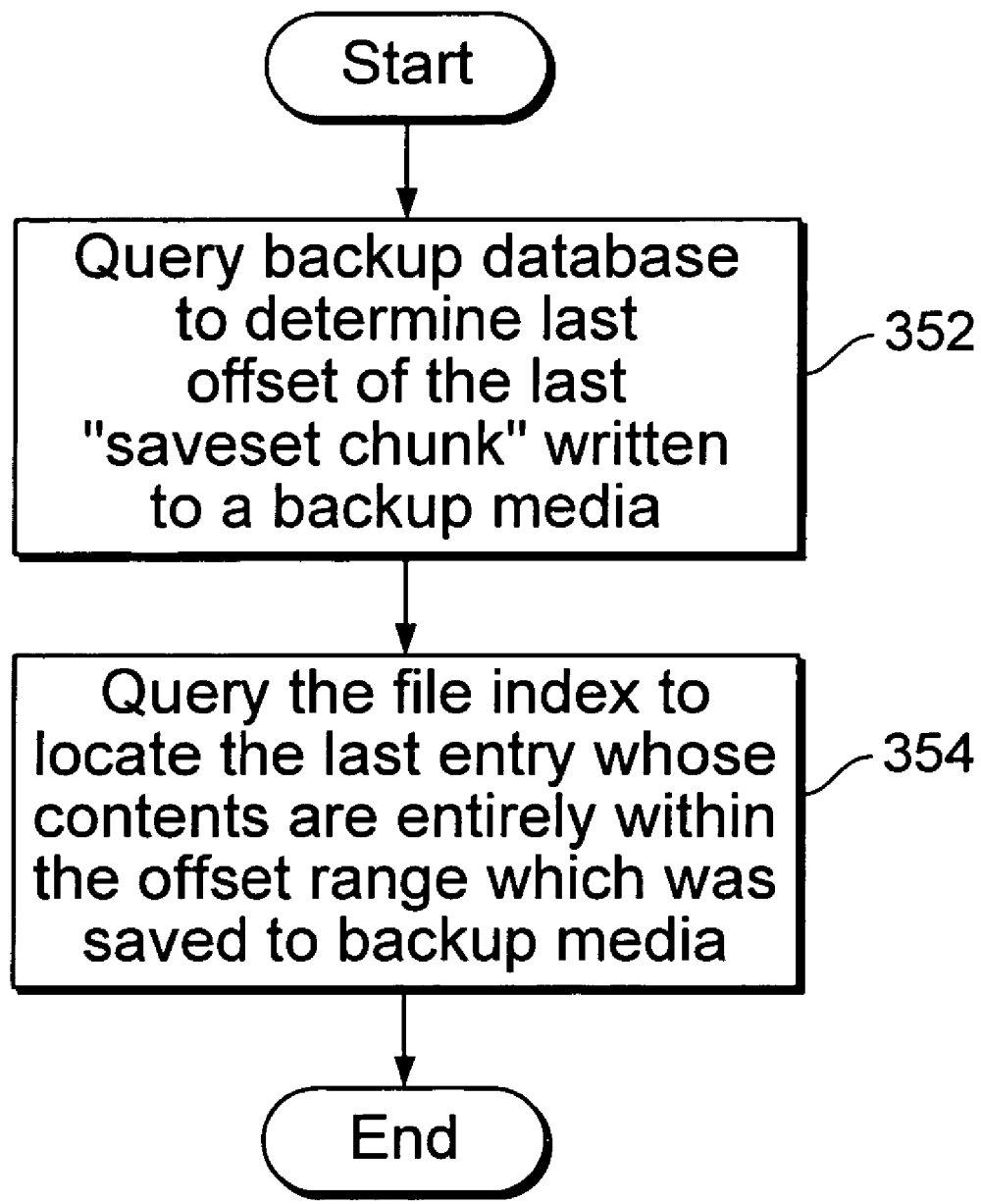
FIG. 3E illustrates an embodiment of a process for determining the last file system entry successfully written to a backup media.

FIG. 3E illustrates an embodiment of a process for determining the last file system entry successfully written to a backup media. The process of FIG. 3C is used in one embodiment to implement 340 of FIG. 3D. This example is merely illustrative. Any process of determining the last file system entry successfully written to a backup media can be used. In the example shown, a backup database is queried at 352 to determine the last (i.e., ending) offset of the last "saveset chunk" saved successfully to a backup media prior to the backup operation being interrupted. In an embodiment, the offset is associated with a placement indicating the offset from the beginning of a saveset, i.e., offset of the beginning of a saveset is zero. In an embodiment, a "saveset chunk" is any grouping of data written to a backup media. In an embodiment, the last offset can be obtained by any process of obtaining data. At 354, a file index is queried to locate the last file system entry whose contents are entirely within the offset range which was saved to a backup media. In an embodiment, the last file system entry whose contents are entirely within the last offset is determined by comparing the file system entry ending offsets relative to the reference point with the last offset. In an embodiment, the file index includes offset information relative to a reference point for each entry in a saveset. In another embodiment, last offset information for a file is calculated from a beginning offset and file size logged for the file as backup of the file began. In an embodiment, the file index is a part of the file system. In another embodiment, the file index is associated with the backup database.

Figure 3F:
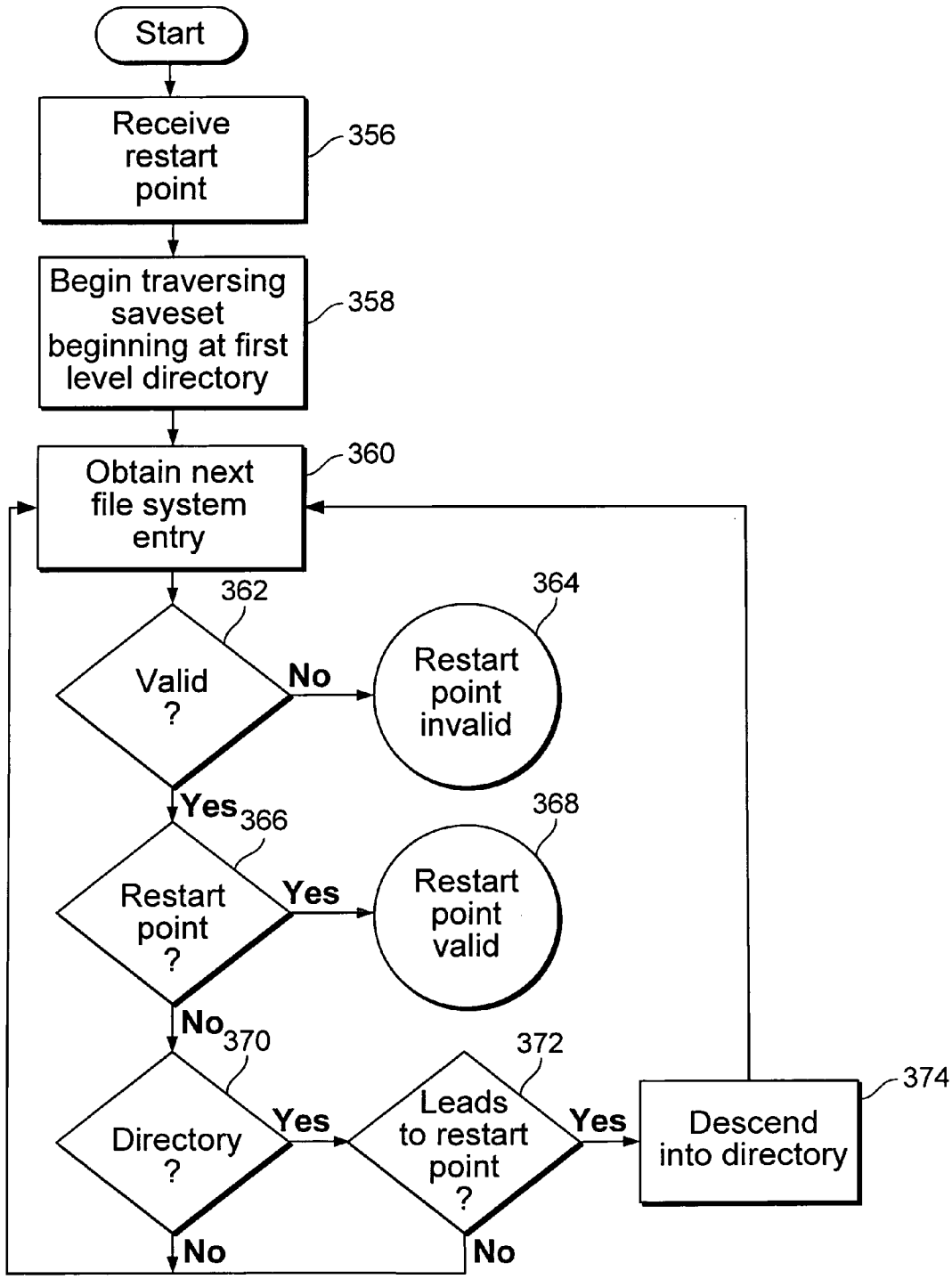
FIG. 3F illustrates an embodiment of a process for establishing process context.

FIG. 3F illustrates an embodiment of a process for establishing process context. The process of FIG. 3F is used in one embodiment to implement 342 of FIG. 3D. In the example shown, a restart point is received at 340. The restart point may be any data associated with the last processed file system entry, i.e., a file system path corresponding to the last file saved completed to backup media prior to interruption of an associated backup operation. In an embodiment, the restart point is data associated with the last file system entry successfully written to the backup media as determined at 340 of FIG. 3D. At 358, the saveset is traversed beginning at the first level directory. At 360, a next file system entry in the current directory being traversed is obtained. If the obtained entry is not valid as determined at 362, a restart point invalid conclusion is reached at 364. In an embodiment, the obtained entry could be invalid because no more file system entries exists in the directory currently being traversed, an entry associated with or affecting the restart point and/or the restart path has been changed, moved, or deleted, or due to an error in the file system. In an embodiment, the conclusion of 364 is associated with the invalid decision at 344 of FIG. 3D. If the obtained entry is determined at 362 to be valid and is determined at 366 to correspond to the restart point, a restart point valid conclusion is reached at 368. In an embodiment, the conclusion of 368 is associated with the valid decision at 344 of FIG. 3D. If the obtained entry is not the restart point as determined at 366, and the obtained entry is a directory entry as determined at 370, whether the obtained directory entry leads to the restart point is determined at 372. In an embodiment, a directory leads to the restart point if the directory is a part of the file system path leading to the restart point. If the obtained directory entry leads to a restart point as determined at 372, the obtained directory entry is descended into at 374. Descending into the directory may not be a recursive process. In an embodiment, descending into the directory comprises building a recursive stack. In an embodiment, descending into the directory comprises one or more of the following: building a traverse list, backing up data, reading a file system entry, reading contents of a directory, traversing a directory, and initializing one or more variables and data structures. A next file system entry in the descended directory is obtained at 360. If the obtained entry is not a directory as determined at 370 or does not lead to a restart point as determined at 372, a next file system entry in the current directory being traversed is obtained at 360. In an embodiment, the file system is traversed in a repeatable order, i.e., file system entries are traversed in the order of a traverse list built for each directory.

While file system traversal and backup are described in certain of the embodiments discussed above, the approaches described herein may be applied to traverse any data structure in a repeatable manner.

The processes shown in FIGS. 3A, 3B, 3C, 3D, 3E and 3F and described above may be implemented in any suitable way, such as one or more integrated circuits and/or other device, or as firmware, software, or otherwise.

Although the foregoing embodiments have been described in some detail for purposes of clarity of understanding, the invention is not limited to the details provided. There are many alternative ways of implementing the invention. The disclosed embodiments are illustrative and not restrictive.

What is claim is:

1. A method of processing hierarchical data having a hierarchy comprising:
   receiving a first list of items in a first level of the hierarchy of the hierarchical data, wherein the hierarchical data is a saveset comprising a file system or a portion thereof;
   sorting the first list in an order based on an item attribute that is independent of a physical storage location at which a particular item is physically stored on a storage device;
   processing the data of the first level in the order of the sorted first list, including by performing the following in sorted order for each of the items in the sorted first list:
      backing up data associated with the item; and
      after backup of the item has completed and prior to processing of a next item, generating a record indicating that backup associated with the item has completed; and
   if another level of the hierarchy of the hierarchical data is encountered during processing of the first level:
      discontinuing, at least temporarily, processing of items in the first list;
      receiving a second list of items in the encountered level;
      sorting the second list in the order based on the same item attribute used to sort the first list; and
      processing the data of the second level in the order of the sorted second list, wherein said steps of receiving the second list of items, sorting the second list, and processing the data of the second level are performed prior to processing of items in the first list being resumed.

2. A method as recited in claim 1, further comprising resuming processing the hierarchical data in the event an operation with which said processing of the hierarchical data is being performed is interrupted, without restarting the operation from the beginning, including by determining a restart point based at least in part on the one or more generated records, traversing the hierarchical data to reach the restart point, and processing remaining elements of the hierarchical data, in the same order in which the hierarchical data was traversed prior to the interruption, as required to continue the operation.

3. A method as recited in claim 2, wherein traversing the hierarchical data to reach a restart point includes traversing, in the same order in which the hierarchical data was traversed prior to the interruption, at least a portion of the hierarchical data processed prior to the interruption.

4. A method as recited in claim 1, further comprising resuming processing data at the first level beginning with a next item in the order of the first list, if any, once processing of a last item in the second list has been completed.

5. A method as recited in claim 1, wherein the first list is stored in a first location in a stack data structure and the second list is stored in a second location in a stack data structure, wherein the first location is associated with the first level of data and the second location is associated with the second level of data.

6. A method as recited in claim 1, wherein hierarchical data comprises data organized as a tree, a directory, an array, or a linked list.

7. A method as recited in claim 1, wherein receiving the first list of items includes receiving data from a content listing process.

8. A method as recited in claim 1, wherein receiving the first list of items includes issuing one or more requests to read a directory.

9. A method as recited in claim 1, wherein the first level comprises a first directory and the second level comprises a second directory that is a subdirectory within the first directory.

10. A method as recited in claim 1, wherein the first level is a root directory of a saveset.

11. A method as recited in claim 1, wherein the first level is a more general level of the hierarchical data than the second level.

12. A method as recited in claim 1, wherein sorting the first list in an order comprises ordering the items in a repeatable order.

13. A method as recited in claim 1, wherein sorting the first list in an order comprises ordering the items in a canonical order.

14. A method as recited in claim 1, wherein the item attribute includes one or more of the following: item type, item modification time, item creation time, item size, and inode number.

15. A method as recited in claim 1, wherein processing the data of the first level includes traversing the data of the first level.

16. A method as recited in claim 1, wherein any number of levels may be encountered during processing.

17. A method as recited in claim 1, wherein processing can be discontinued.

18. A method as recited in claim 1, wherein processing can resume from a last completed item if processing had been discontinued.

19. A method as recited in claim 1, wherein processing can resume from a last completed item if processing had been discontinued and a predetermined or dynamically configured amount of time has not passed since the discontinuation.

20. A method as recited in claim 1, wherein processing can resume from a last completed item if processing had been discontinued and the hierarchical data has not been modified since the discontinuation.

21. A method as recited in claim 1, wherein the steps of discontinuing, receiving the second list of items, sorting the second list, and processing the data of the second level in the event another level of the hierarchy of the hierarchical data is encountered is performed recursively.

22. A system for processing hierarchical data having a hierarchy comprising:
    a processor configured to:
        receive a first list of items in a first level of the hierarchy of the hierarchical data, wherein the hierarchical data is a saveset comprising a file system or a portion thereof,
        sort the first list in an order based on an item attribute that is independent of a physical storage location at which a particular item is physically stored on a storage device,
        process the data of the first level in the order of the sorted first list, including by performing the following for each of the items in the sorted first list:
            backing up data associated with the item; and
            after backup of the item has completed and prior to processing of a next item, generating a record indicating that backup associated with the item has completed, and
        if another level of the hierarchy of the hierarchical data is encountered during processing of the first level:
            discontinue, at least temporarily, processing of items in the first list;
            receive a second list of items in the encountered level,
            sort the second list in the order based on the same item attribute used to sort the first list, and
            process the data of the second level in the order of the sorted second list, wherein said steps of receiving the second list of items, sorting the second list, and processing the data of the second level are performed prior to processing of items in the first list being resumed; and
    a memory coupled to the processor and configured to provide instructions to the processor.

23. A system as recited in claim 22, wherein the processor is further configured to resume processing data at the first level beginning with a next item in the order of the first list, if any, once processing of a last item in the second list has been completed.

24. A system as recited in claim 22, wherein the processor is further configured to resume processing the hierarchical data in the event an operation with which said processing of the hierarchical data is being performed is interrupted, without restarting the operation from the beginning, including by determining a restart point based at least in part on the one or more generated records, traversing the hierarchical data to reach the restart point, and processing remaining elements of the hierarchical data, in the same order in which the hierarchical data was traversed prior to the interruption, as required to continue the operation.

25. A system as recited in claim 24, wherein traversing the hierarchical data to reach a restart point includes traversing, in the same order in which the hierarchical data was traversed prior to the interruption, at least a portion of the hierarchical data processed prior to the interruption.

26. A system as recited in claim 22, wherein the item attribute includes one or more of the following: item type, item modification time, item creation time, item size, and inode number.

27. A computer program product for processing hierarchical data having a hierarchy, the computer program product being embodied in a computer readable storage medium and comprising computer instructions for:
    receiving a first list of items in a first level of the hierarchy of the hierarchical data, wherein the hierarchical data is a saveset comprising a file system or a portion thereof;
    sorting the first list in an order based on an item attribute that is independent of a physical storage location at which a particular item is physically stored on a storage device;
    processing the data of the first level in the order of the sorted first list, including by performing the following for each of the items in the sorted first list:
        backing up data associated with the item; and
        after backup of the item has completed and prior to processing of a next item, generating a record indicating that backup associated with the item has completed; and
    if another level of the hierarchy of the hierarchical data is encountered during processing of the first level:
        discontinuing, at least temporarily, processing of items in the first list;
        receiving a second list of items in the encountered level;
        sorting the second list in the order based on the same item attribute used to sort the first list; and
        processing the data of the second level in the order of the sorted second list, wherein said steps of receiving the second list of items, sorting the second list, and processing the data of the second level are performed prior to processing of items in the first list being resumed.

28. A computer program product as recited in claim 27, further comprising resuming processing data at the first level beginning with a next item in the order of the first list, if any, once processing of a last item in the second list has been completed.

29. A computer program product as recited in claim 27, further comprising resuming processing the hierarchical data in the event an operation with which said processing of the hierarchical data is being performed is interrupted, without restarting the operation from the beginning, including by determining a restart point based at least in part on the one or more generated records, traversing the hierarchical data to reach the restart point, and processing remaining elements of the hierarchical data, in the same order in which the hierarchical data was traversed prior to the interruption, as required to continue the operation.

30. A computer program product as recited in claim 29, wherein traversing the hierarchical data to reach a restart point includes traversing, in the same order in which the hierarchical data was traversed prior to the interruption, at least a portion of the hierarchical data processed prior to the interruption.

31. A computer program product as recited in claim 27, wherein the item attribute includes one or more of the following: item type, item modification time, item creation time, item size, and inode number.

* * * * *